(12) United States Patent
Nelson

(10) Patent No.: US 8,528,471 B2
(45) Date of Patent: Sep. 10, 2013

(54) DIP AND DRAIN CANISTER COLANDER

(76) Inventor: Dorothy Jean Nelson, Little Rock, AR (US)

(*) Notice: Subject to any disclaimer, the term of this patent is extended or adjusted under 35 U.S.C. 154(b) by 268 days.

(21) Appl. No.: 13/065,543

(22) Filed: Mar. 24, 2011

(65) Prior Publication Data

US 2011/0192427 A1 Aug. 11, 2011

Related U.S. Application Data

(63) Continuation-in-part of application No. 12/313,040, filed on Nov. 18, 2008, now abandoned.

(51) Int. Cl.
*A47J 43/24* (2006.01)

(52) U.S. Cl.
USPC .............................. 99/495; 210/163; 210/407

(58) Field of Classification Search
USPC .................. 99/339, 340, 426, 427, 449, 450, 99/495; 210/305, 310, 455, 464, 470, 473, 210/477, 497
See application file for complete search history.

(56) References Cited

U.S. PATENT DOCUMENTS

| | | | | |
|---|---|---|---|---|
| 3,389,651 A | * | 6/1968 | Schultz | 99/393 |
| 3,933,645 A | * | 1/1976 | Keramidas | 210/305 |
| 3,935,958 A | * | 2/1976 | Frangos | 220/488 |
| 4,626,352 A | * | 12/1986 | Massey et al. | 210/469 |
| 5,740,724 A | * | 4/1998 | Fabrikant et al. | 99/426 |
| 6,405,638 B1 | * | 6/2002 | Chen | 99/318 |
| 2004/0231608 A1 | * | 11/2004 | Grace-Kellogg | 119/72 |
| 2006/0032810 A1 | * | 2/2006 | Dudley | 210/464 |

* cited by examiner

*Primary Examiner* — Tu B Hoang
*Assistant Examiner* — Thien S Tran

(57) ABSTRACT

The present invention relates to a new and improved colander, a kitchen utensil comprised for washing vegetables and fruits thorough and in larger quantity. The dip and drain canister colander comprising of perforated stainless steel wire, manufactured, is suitable for washing vegetables and fruits. The perforated holes are diamond shaped holes arranged in order, connected together being alike, that extents within the entire colander. The upright container is a four sided figure, a square base, the opening area is the same equivalent as the base. The colander has the quality of being deep, a distance between the top and base, a removable lid, a small knob centered on the outer surface of the lid and a pull on the upper back of the colander to clutch with hand. A thorough washing is attained by performing the Maneuver Techniques, which is done repeatedly until desirable results are achieved, with changing waters, the debris will diminish.

1 Claim, 4 Drawing Sheets

Figure 1:
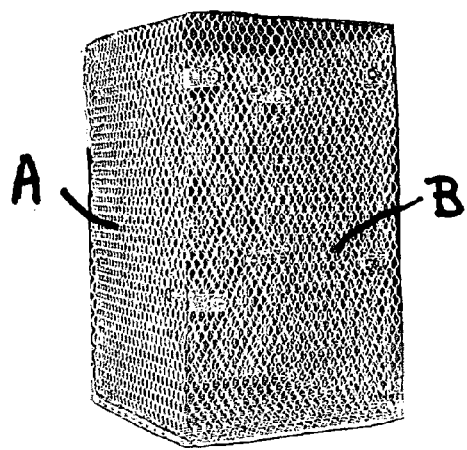

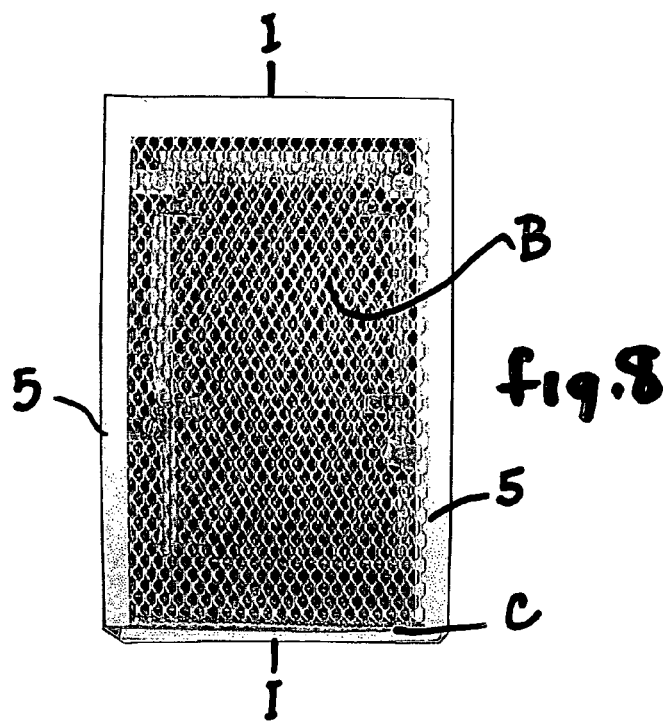
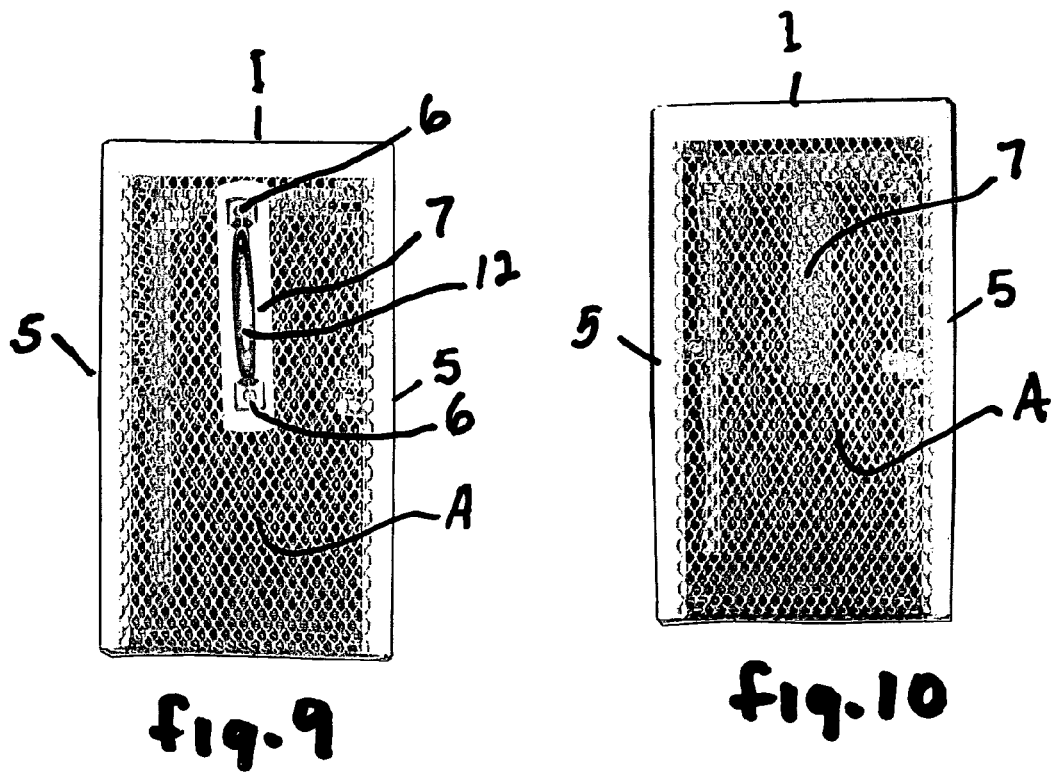
fig. 8
fig. 9
fig. 10

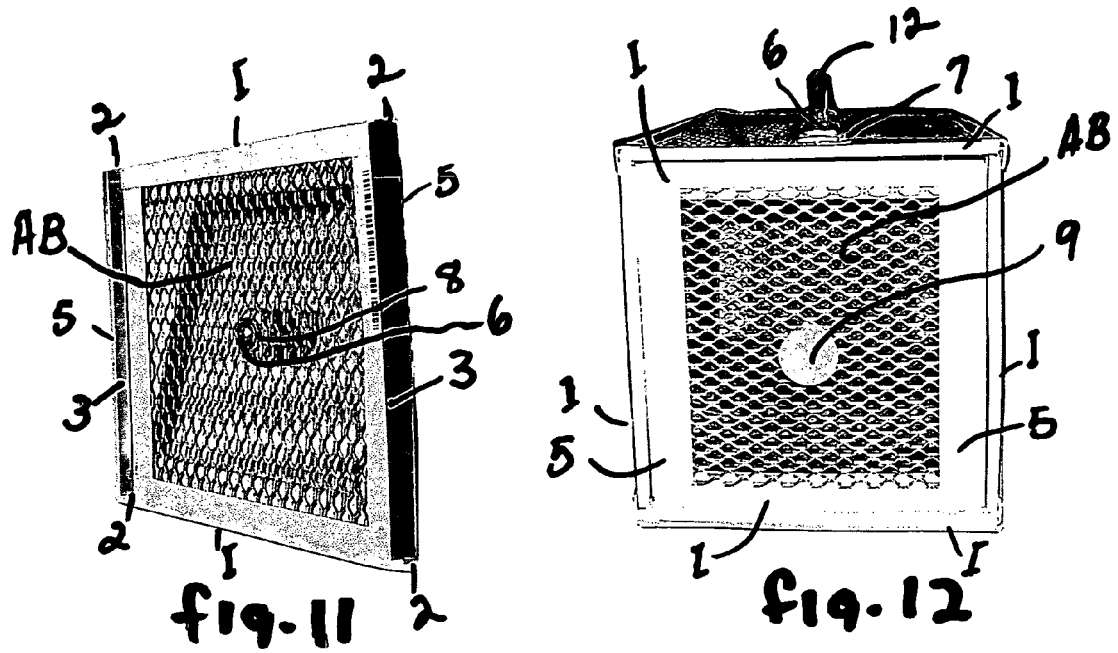
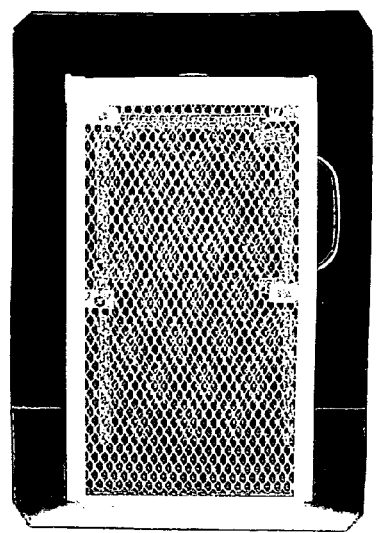

DIP AND DRAIN CANISTER COLANDER

The present invention relates to a new and improved colander, the dip and drain canister colander, a kitchen utensil and more particularly, pertains to washing vegetables and fruits thorough and in larger quantity.

BACKGROUND OF THE INVENTION

Descriptions of the Prior Arts

A kitchen colander is a device, a perforated utensil for draining food as described in the Webster Intermediate Dictionary. Kitchen colanders comprising of plastic, aluminum, stainless steel, and silicon; the opening holes in colanders differ in size and the same applies to the structure of colanders, some are rounded hollow dish, shaped like a bowl. The prior art, the Reston Uoyd Calypso Basic 5 qt. colander, measures 6.4 inches high and 11 inches in diameter a rounded hollow dish, basically structure for draining food, no lid to prevent an overflow if emerged under water.

The Whitehaus WHNECOL stainless steel over the sink extendible colander has a rectangular shape, dimension: 13.5"L×10.5"W×4"D, with side handles it expands to 22.5" inches in length, no lid to prevent an overflow if emerged under water.

Tupperware has a double colander, dimension: 8.0" inches in width, 45" in height, when locked together 2 quarts capacity that can emerged under water. The structure of the colander comprising a bowl shaped device a rounded hollow dish. In this respect, the dip and drain canister colander according to the present invention departs from the conventional concepts and designs of the prior art, and in doing so provides an apparatus primary developed for the purpose of washing vegetables and fruits thorough and in larger quantity, therefore it can be appreciated that there exists a continuing need for a new and improved colander, a kitchen utensil for washing vegetables and fruits thorough and in larger quantity and that's what the dip and drain canister colander allows.

SUMMARY OF THE INVENTION

In view of the foregoing disadvantages inherent in the known types of colanders, kitchen utensil of known designs and configurations, now present in the prior art, the present invention provides a new and improved colander, a kitchen utensil. As such, the general purpose of the present invention, will be described in great detail, is to provide a new and improved colander, a kitchen utensil and methods which have advantages of the prior art.

The present invention essentially comprised a new and improved colander, a kitchen utensil, the dip and drain canister colander a device to wash vegetables and fruits thorough and In larger quantity, comprising a container of perforated stainless steel wire that is fabricated, whereas the stainless steel metal consist of 10.5% chromium or more and 50% iron or more which is an alloy metal, that has a hygienic surface, surface has no pores or cracks to harbor dirt, grime, or bacteria, corrosion resistance, and good for welding. The fabricated perforated stainless steel wire is comprised of quality metal that is suitable for washing vegetables and fruits. The present invention comprising a configuration having a flat lower surface that is square with straight edges; the side walls are flat, a front and back wall, a left and right wall connected together on all four sides comprising an upright container having a square shaped opening area that is opposite of the lower surface, the base; a removable lid with a flat square surface, that fits inside the top opening area of the colander, a small metal knob with a rounded shaped configuration that is attached on the outer surface of the lid, centered. The lid is a component of a canister, a canister is describes as a wide mouth container with a lid; a pull with a curved configuration is attached on the upper back of the colander. There has thus been outlined, rather broadly the more important features of the invention that will be described herein after and which will form the subject matter of the claims.

It is an object of the present invention to provide a new and improved colander, a kitchen utensil and more particularly, pertains to washing vegetables and fruits thorough and in larger quantity, which has advantages of the prior art, colanders a kitchen utensil of known designs and configurations.

It is another object of the present invention to provide a new and improved colander, a kitchen utensil which may be easily efficiently manufactured and marketed.

An even further object of the present invention is to provide a new and improved colander, a kitchen utensil which is susceptible of a low cost of manufacture with regard to both materials and labors, and which according is the susceptible of low prices of sales to the consuming public, thereby making such a colander economically available to the buying public.

Lastly it is an object of the present invention to provide a colander for washing vegetables and fruits thorough and in larger quantity, and that's what the dip and drain canister colander allows. The colander comprising a container upright configuration including fabricated perforated stainless steel wire, with a series of sizeable holes that is crucial the holes allows water to move rapidly inside and outside during the washing process. The holes are diamond shaped pattern arranged in order and connected together being alike; a removable lid that clamps on the inside the top opening area of the canister colander as needed for confinement of the vegetables and fruits, if the colander having to be emerged into a sink partial filled with water, the colander then is placed front faced, length-wise in the sink; the colander can also be used upright in a kitchen sink; a pull on the upper back of the colander provides with what is useful, a device to clutch with hand. When the hand is placed inside the enclosed area of the pull, it serves as a brace, it keep the hand steadfast, firmly fixed in place that makes it easy control the colander during the washing process, eliminating having to emerge hands into water constantly. The canister colander provides with what is useful in washing a variety of green leaf vegetables such as mustard, turnip and collard greens that are usually washed by emerging hands into water constantly.

The canister colander having the quality of being deep, a distance between the top opening area and the base, allows for the accommodation of larger quantity of vegetables and, or fruits to be washed. Lettuce and spinach are delicate vegetables that can be washed in the colander without being torn apart or left flabby, "unless" the condition of the vegetables existed from the start, the same applies to delicate fruits such as strawberries, blackberries to name a few.

There is a growing need to wash vegetables and fruits more thorough and that's what the dip and canister colander allows. A thorough washing is attained by using the colander with the removable lid clamped inside the top opening area of the colander, if needed to confine.

The maneuver techniques: swaying, dipping, and pushing the colander slowly, when the colander is emerged into a sink partial filled with water, the maneuver techniques creates friction in the water causing the vegetables and, or fruits to glide, therefore debris such as dirt, sand, insect particles and pesticides that covers the outer surface of the vegetables and fruits are filtered out through the series of sizeable diamond shaped holes, arranged in order that are connected together being alike. The holes allows the water to move rapidly inward and outward during the washing, which is done repeatedly until desirable results are achieved, with changing waters, the debris will diminish.

With these objects in mind, the present invention relates to a new and improved colander, a kitchen utensil and more particularly, pertains to washing vegetables and fruits thorough and in larger quantity, should be highly consider of the performance it provide.

BRIEF DESCRIPTION OF THE SEVERAL VIEWS OF THE PHOTOGRAPHS

Figure 2:
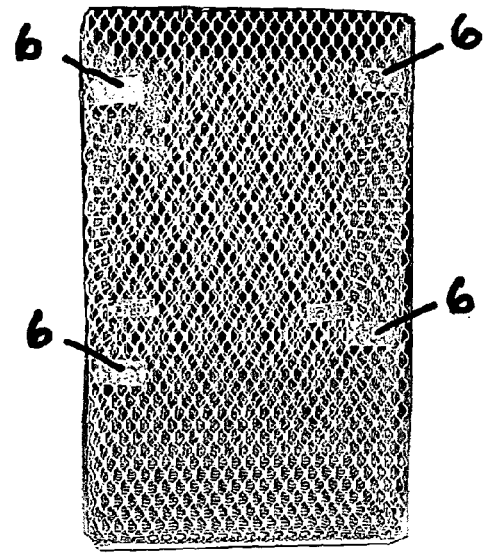

FIG. 1-2. Show preferred embodiment of the new and improved invention in an upright position.

Figure 3:
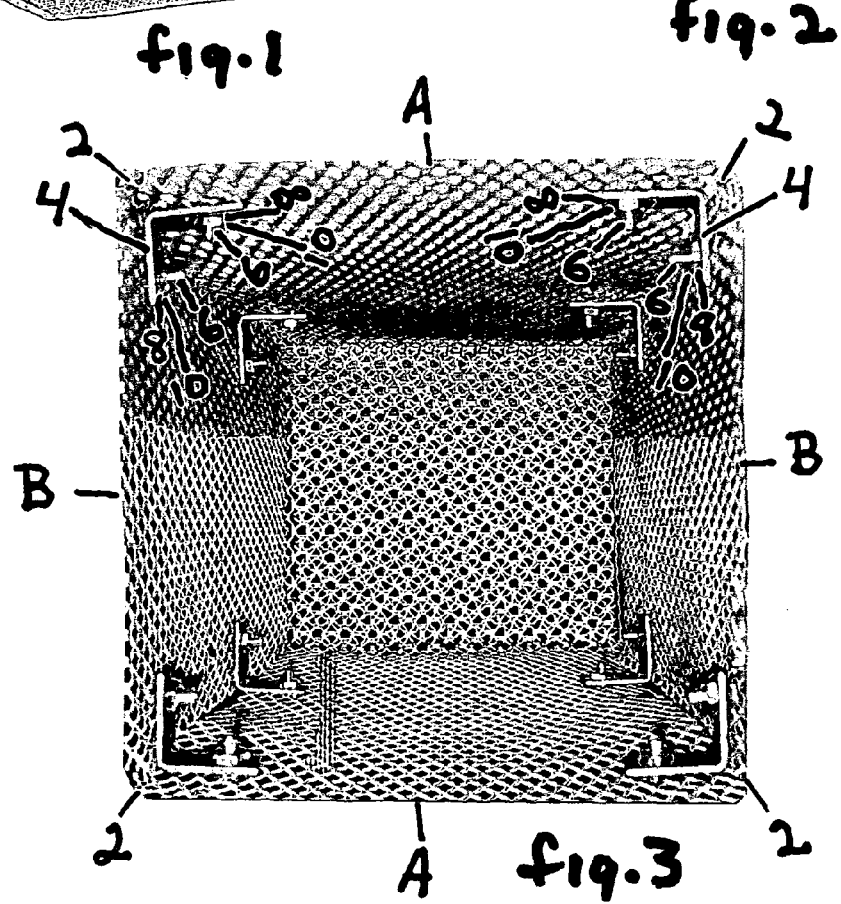

FIG. 3. Illustrates the inside structure from the base to the top opening area of the colander.

Figure 4:
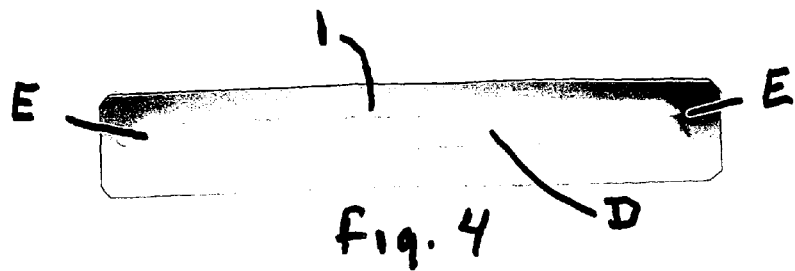
Figure 5:
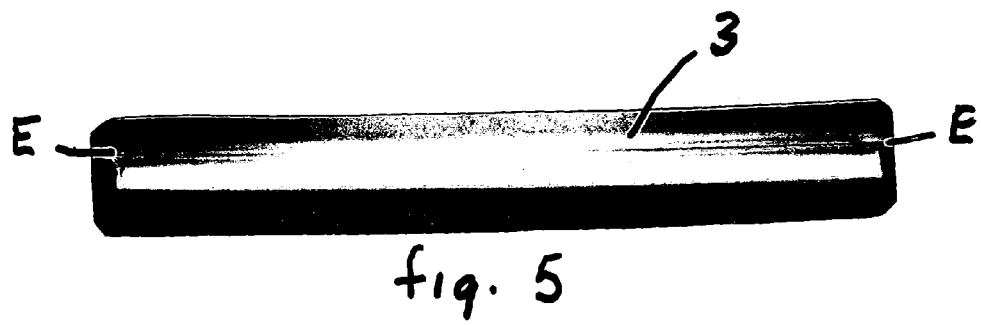

FIG. 4-5. Show another embodiment.

Figures 6, 7:
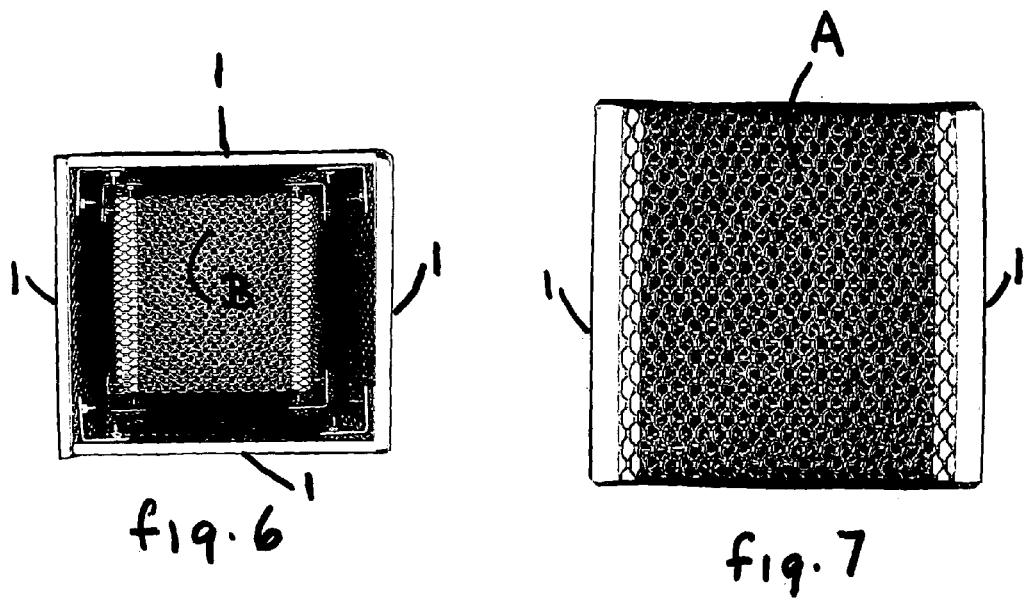

FIG. 6-7. Shows embodiments on the top opening area and the base of the colander.

FIG. 8-10. Shows upright positions, a side view, back and front view of the embodiments.

FIG. 9. Shows preferred embodiment on the upper back of the colander, and as in FIG. 12.

FIG. 11. Illustrates the inside structure of the lid and the embodiment.

FIG. 12. Show preferred embodiment on the outside of the lid and the lid stationed inside the opening area of the colander.

FIG. 13. Referring to the present invention a new and improved colander, the dip and drain canister, a kitchen utensil and more particularly, pertains to washing vegetables and fruits thorough and in larger quantity, shows the finished product.

DETAILED DESCRIPTION OF THE INVENTION

In the preferred embodiment, the present invention, the new and improved colander, a kitchen utensil for washing vegetables and fruits thorough and in larger quantity. Wherein the colander comprising a configuration having a flat lower surface that is square with straight edges; the side wails are flat, a front and back wall, a left and right wall connected together on all four side, having a square shaped opening area, that is opposite the lower surface the base, with the same size equivalent comprising a upright container having the quality of being deep, a distance between the top opening area and the base, 11 inches; comprised of fabricated perforated stainless steel wire, with a series of holes that are sizeable diamond shaped pattern arranged in order and connected together being alike, the wire is suitable for washing vegetables and fruits. The colander walls are connected together as described in FIG. 3, No. 2, No. 4, No. 6, and No. 8. Welding is another choice for adjoining the side walls that has been disclosed by inventors of prior art; the present invention comprising a removable lid that clamps inside the top opening area of the colander, is used as needed for confinement.

As used herein, the term "fabricated" perforated stainless steel wire, refers to holes that has been punched into expanded metal plates, and stretched, fabricated wire is created, manufactured, the comprised configuration of the holes are requested by the customer. Regarding the size of the holes comprising the present invention, canister colander, it is useful in having sizeable holes, that contributes greatly in attaining a thorough wash, the sizeable holes allows water to move rapidly inward and outward during the washing process, the dimensions are 0.5 of cm in diameter, and 0.7 of a cm in length, whereas the holes are diamond shaped pattern, becoming gradually smaller toward the end.

Another embodiment of the present invention the new and improved colander, the dip and drain canister, a kitchen utensil and more particularly, pertains to washing vegetables and fruits thorough, is a method for using the colander, the maneuver techniques: Swaying, Dipping, and Pushing the colander slowly when the colander is emerged into a sink partial filled with water, the maneuver techniques creates friction in the water causing the vegetables and fruits to glide, that loosen debris such as dirt, sand, insect particles, and pesticides that covers the outer surface of the vegetables and fruits, are filtered out through the series of sizeable diamond shaped holes, arranged in order that are connected together being alike, the holes allows the water to move rapidly inward and outward during the washing process, which is done repeatedly until desirable results are achieved, with changing waters, the debris will diminish.

Preferably the present invention having a lid that is used for confinement, comprising a small rounded shaped metal knob, centered on the outer top of lid to clutch with hand, when the colander having to be emerged into a sink partial filled with water, with the front side faced down in the sink, the lid should be damped inside the top opening area of the colander to confine the vegetables and fruits during the washing process, the colander can be used upright in the sink, with or without the lid, the positioning of the colander is preferable when washing vegetables or fruits. The structure of the present invention the new and improved colander Comprising a flat square base and flat walls on all four sides connected together, having a square shaped opening area, that is opposite the base with the same size equivalent comprising a upright container having the quality of being deep, a distance between the top opening area and the base, with a pull on the upper back of the four sided colander allows versatile positioning of the colander, an improvement over the prior art.

Preferably the present invention, the new and improved colander, a kitchen utensil, having a lid comprised of fabricated perforated stainless wire, the same designed and arrangements that comprises canister colander, the lid having a fiat square surface that measured 6 inches on all four side, fits inside the top opening area of the colander.

Another preferred embodiment of the present invention, the new and improved colander, a kitchen utensil comprising a metal curved shaped pull that is attached on the upper back of the colander, that provides with what is useful, a device to dutch with hand, the hand is placed inside the enclosed area of the pull, it serves as a brace, it keep the hand steadfast, firmly fixed in place that makes it easy to control the colander during the washing process, which is a another improvement over the prior art, that has been disclosed by prior inventors. Whereas the handles on the prior art, comprising extended handles on each side of the colander, or extended arm shaped handle that is on the back side of the Colander to clutch.

FIG. 1-2. Shows a preferred embodiments of the present invention, the dip and drain canister colander, comprising designs and configurations in a vertical position comprised of fabricated perforated stainless steel wire, having sizeable diamond shaped patterned holes arranged in order, connected together being alike.

FIG. 3. Shows 2 pieces of fabricated perforated stainless steel wire measure approximately 28"×6" inches, wire is bent having a square base measure approximately 6"×6" inches, having flat side walls, vertical that are opposite of the base, 11" inches in height, the top opening area of the container being square measure approximately 6"×6" inches. The wires are connected together by crisscrossing the wire B inside the A wire, creating a four sided figure by connecting the front and back wire and the left and right wire together thereby forming a container that is vertical; alphabet C is the gap between the double base measure approximately one fourth of a centimeter, alphabet A wire being the outside base is a prop for the inside wire B shown in FIG. 1 and FIG. 8.

FIG. 3. Shows the inside structure of the corners connected together. No. 2 are the corners of the flat side walls being connected together. No. 4 corner braces 1" inch from the top opening area of the colander on all four sides, a repeat 6" inches from the top opening area of the colander, total 8 braces; No. 6 notch headed screws, assembled through the existing holes in the braces and the perforated wire; No. 8 flat lock washers are placed between the perforated wire and hex nuts; No. 10 hex nuts are tighten and secured, total 16 screws, washers and hex nuts connecting the flat sides, walls together.

FIG. 4. Shows plastic border strip embodiment measure approximately 6" inches in length, E is the ridge and No. 1 is the top edge of the border strip.

FIG. 5. Shows plastic outside corner strip embodiment measure approximately 11 inches in length, E is the ridge and No. 3 is the extended edge of the corner strip.

FIG. 6-7. Shows the plastic border strip embodiments around the top opening area of the colander and the left and right side of the bottom base.

FIG. 8-10. Shows upright positions, vertical, a front, side and back view of the colander with plastic outside corner strip embodiments on all four upright corners, that serves as a stabilizer, a finished appearance.

FIG. 9. Shows plastic strip embodiment, flat surface measure approximately 6" inches in length, and one and a fourth inches in width, holes are drilled in plastic strip measure approximately three fourth of an inch from the top and the bottom of the plastic strip, No. 12 the stainless steel pull, a round curved shape device, measure approximately four and three-fourth inches in length, centered on the plastic strip, attached on the upper back of the colander, approximately 1" inch from the top, same procedures are used to attach the pull as in FIG. 3, No. 6, 8 and 10.

FIG. 11. Shows the lid, comprising of fabricated perforated stainless steel wire, a series of holes, sizeable diamond shaped pattern, arranged in order, connected together being alike, measure approximately five and one-half inches on all four sides. No. 3 shows 2 pieces of plastic outside corner strips embodiment, measure approximately 6" inches in length, with an approximately one-half of an inch, extended edge, FIG. 11. Shows 2 pieces of plastic border strip embodiments, No. 1, the same measurement as in FIG. 11, No. 3, that are on opposite sides of the lid, whereas the same in FIG. 11, No. 3., the wire is latched between the ridges of the strips, shown in FIG. 4-5, alphabet E., the plastic strips embodiments that covers the wire edges of the lid, increases the size of the lid approximately one-half of an inch on all four side, therefore the measurement is approximately 6"×6".

FIG. 11., No. 6-8 Shows the inside structure of the stainless steel rounded shaped metal knob, centered on the top surface of the lid, the same procedures in FIG. 3., No. 6, 8, and 10 to assemble the lid FIG. 12., No. 9 Shows the outside view of the lid and the metal knob, whereas the is clamped on the inside of the canister colander, firmly pressing against the top four braces on each corner of the colander, shown in FIG. 3., No. 4.

FIG. 13. Referring to the present invention, the new and improved colander, the dip and drain canister colander, a kitchen utensil and more particularly, pertains to washing vegetables and fruits thorough and in larger quantity shows the finished canister colander, comprising designs and configuration.

While the invention has been disclosed by reference to presently preferred embodiments, it will be recognized that the changes and alterations can be made without departing from the spirit and the scope of the following claims:

What is claimed is:
1. A colander kitchen utensil for washing vegetables and fruits, comprising: an upright container, comprising: four vertical side walls connected together, having an opening area, and a square base located opposite of the opening area connected to the bottom of the four vertical side walls; a removable square lid detachably coupled to the opening area to confine the vegetables and fruits during the washing process; a pull attached on the upper back of one of the vertical side walls; a small metal knob attached to and centered on the outer surface of the lid; at least one corner brace assembly comprising: a corner brace, screw, hex nut and washer; at least one plastic strip; wherein the four vertical side walls, square base and square lid comprise a fabricated perforated stainless steel wire mesh, having sizeable holes therein; wherein the fabricated perforated stainless steel wire mesh is composed of chromium and iron, having a series of diamond shaped holes with dimensions of 0.5 cm×0.7 cm; wherein the square lid and square base are 6 inches on all four sides; wherein the four vertical wall are 11 inches in height; wherein the pull has a curved shape configuration, is composed of stainless steel, has a length of four and three-fourth inches and is spaced 1 inch from the vertical side wall; wherein the at least one corner brace assembly connects the colander together; wherein the at least one plastic strip is coupled to the side walls and square lid.

* * * * *